(12) United States Patent
Ogasahara (10) Patent No.: US 8,538,263 B2
(45) Date of Patent: Sep. 17, 2013

(54) OPTICAL COMMUNICATION SYSTEM, OPTICAL RECEIVER OF SAME, AND OPTICAL COMMUNICATION METHOD OF SAME

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 13/376,121

(22) PCT Filed: Mar. 26, 2010

(86) PCT No.: PCT/JP2010/002174
§ 371 (c)(1),
(2), (4) Date: Dec. 2, 2011

(87) PCT Pub. No.: WO2010/140289
PCT Pub. Date: Dec. 9, 2010

(65) Prior Publication Data
US 2012/0087654 A1    Apr. 12, 2012

(30) Foreign Application Priority Data
Jun. 5, 2009   (JP) ................................ 2009-136215

(51) Int. Cl.
*H04J 14/06* (2006.01)
(52) U.S. Cl.
USPC .............. 398/65; 398/147; 398/159; 398/184
(58) Field of Classification Search
USPC .................................... 398/65, 147, 159, 184
See application file for complete search history.

(56) References Cited

U.S. PATENT DOCUMENTS

| 6,081,360 A * | 6/2000 | Ishikawa et al. .............. 398/147 |
| 2005/0213975 A1 | 9/2005 | Gottwald et al. |
| 2008/0232816 A1 | 9/2008 | Hoshida et al. |

FOREIGN PATENT DOCUMENTS

| JP | 2000-193558 A | 7/2000 |
| JP | 2005-531169 A | 10/2005 |
| JP | 2007-074273 A | 3/2007 |
| JP | 2008-263590 A | 10/2008 |
| JP | 2009239555 A | 10/2009 |
| JP | 2010226499 A | 10/2010 |

OTHER PUBLICATIONS

Office Action, dated Mar. 19, 2013, issued by the Japanese Patent Office in counterpart Japanese Application No. 2011-518219.

* cited by examiner

*Primary Examiner* — Leslie Pascal
(74) *Attorney, Agent, or Firm* — Sughrue Mion, PLLC (57) ABSTRACT

In a polarization demultiplexing optical communication system (1000), an optical transmitter (100) provides a predetermined frequency deviation between carrier wave frequencies of optical signal to be transmitted, and provides a periodic fluctuation having a predetermined frequency to the light intensity of the optical signal to be transmitted. An optical receiver (300) extracts intensity information of a frequency component of the periodic fluctuation from the received optical signal, and calculates a wavelength dispersion value of the optical transmission line on the basis of the extracted intensity information. For this reason, it is possible to measure the wavelength dispersion value of the optical transmission line while operating the optical communication system. Thereby, there is provided an optical communication system capable of resetting the propagation characteristics of an optical waveform equalization section in a simple manner and at a low cost without adversely influencing the transmission quality.

12 Claims, 11 Drawing Sheets

(a) INTENSITY OF OPTICAL SIGNAL GENERATED BY OPTICAL TRANSMISSION SECTION 105-1

(b) INTENSITY OF OPTICAL SIGNAL GENERATED BY OPTICAL TRANSMISSION SECTION 105-2

(c) INTENSITY OF OPTICAL SIGNAL GENERATED BY LIGHT INTENSITY MODULATOR 400-1

(d) INTENSITY OF OPTICAL SIGNAL GENERATED BY LIGHT INTENSITY MODULATOR 400-2

FIG. 6

(a) OPTICAL SPECTRUM OF OPTICAL SIGNAL GENERATED
BY OPTICAL TRANSMISSION SECTION 105-1

(b) OPTICAL SPECTRUM OF OPTICAL SIGNAL GENERATED
BY OPTICAL TRANSMISSION SECTION 105-2

(c) OPTICAL SPECTRUM OF OPTICAL SIGNAL
GENERATED BY OPTICAL PHASE MODULATOR 402-1

(d) OPTICAL SPECTRUM OF OPTICAL SIGNAL
GENERATED BY OPTICAL PHASE MODULATOR 402-2

OPTICAL COMMUNICATION SYSTEM, OPTICAL RECEIVER OF SAME, AND OPTICAL COMMUNICATION METHOD OF SAME

CROSS REFERENCE TO RELATED APPLICATIONS

This application is a National Stage of International Application No. PCT/JP2010/002174 filed Mar. 26, 2010, claiming priority based on Japanese Patent Application No. 2009-136215 filed Jun. 5, 2009 the contents of all of which are incorporated herein by reference in their entirety.

TECHNICAL FIELD

The present invention relates to a polarization demultiplexing optical communication system, having an optical transmitter for transmitting optical signals and an optical receiver for receiving the optical signals, that demultiplexes two independent optical signals of which carrier waves are allocated in the same frequency band and polarization states are at right angles to each other, an optical receiver of the same, and an optical communication method of the same.

BACKGROUND ART

Recently, since the spread of the Internet drastically increased the traffic volumes of backbone communication systems, the early practical use of ultrahigh-speed optical communication systems exceeding 40 Gbps is expected. As a technique for realizing such an ultrahigh-speed optical communication system, a polarization demultiplexing technique has attracted attention.

The polarization demultiplexing technique is a technique that multiplexes two independent optical signals of which carrier waves are allocated in the same frequency band and polarization states are at right angles to each other in an optical transmitter and separates the above-mentioned two optical signals from received signals in an optical receiver, to thereby realize a double transmission rate.

On the contrary, since the symbol rate (baud rate) of the optical signal can be set to ½ and the operation speed of an electrical device can be reduced, device costs can be reduced in other words.

Hereinafter, reference will be made to the drawings to describe an operation of an optical communication system making use of the polarization demultiplexing technique (hereinafter, described as the optical communication system).

Figure 10:
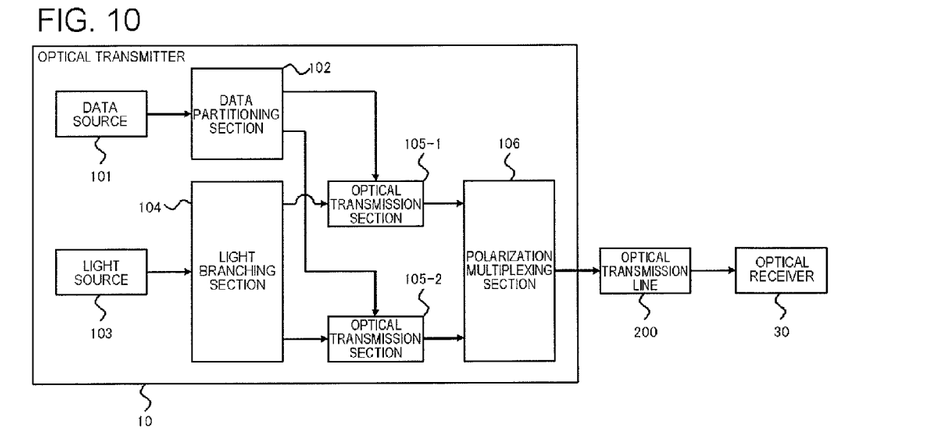
FIG. 10 is a block diagram illustrating the configuration of an optical transmitter in the related art.

First, a description will be made of the process of generating optical signals in an optical transmitter which are used in an optical communication system. FIG. 10 shows a configuration example of an optical transmitter 10 in the optical communication system in the related art.

The optical transmitter 10 in the related art includes each of the blocks of a data source 101, a data partitioning section 102, a light source 103, a light branching section 104, an optical transmission section 105-1, an optical transmission section 105-2, and a polarization multiplexing section 106.

The data source 101 generates transmission data and then transmits the transmission data to the data partitioning section 102. Meanwhile, although the transmission data is typically supplied from other communication equipment connected to the optical transmitter, the optical transmitter 10 itself generates the transmission data for the purpose of simplicity herein.

The data partitioning section 102 dual-partitions (demultiplexes) the transmission data sent from the data source 101, and then transmits the respective resultants to the optical transmission section 105-1 and the optical transmission section 105-2.

As a method of partitioning the transmission data, it is possible to use various types of methods such as a partitioning method for each bit (bit interleave) or a partitioning method for each byte (byte interleave).

The light source 103 outputs laser light having a predetermined frequency to transmit the laser light to the light branching section 104. The light branching section 104 bifurcates the laser light transmitted from the light source 103, and transmits laser light having the same intensity to the optical transmission section 105-1 and the optical transmission section 105-2, respectively.

Although a method of supplying laser light from different light sources having the same light frequency and the same light intensity can also be applied to the optical transmission section 105-1 and the optical transmission section 105-2, it is preferable, in the invention, that carrier wave frequencies of the optical signals transmitted from the optical transmission section 105-1 and the optical transmission section 105-2, respectively, are identical to each other including line widths, and thus the configuration in which the above-mentioned single light source is bifurcated is recommended.

The optical transmission section 105-1 and the optical transmission section 105-2 perform an optical modulation on the basis of data sent from the data partitioning section 102, using the laser light sent from the light branching section 104 as a carrier wave. In the invention, the types of the optical modulation system do not matter. The optical signals generated by each of the optical transmission sections 105-1 and 105-2 are respectively sent to the polarization multiplexing section 106.

The polarization multiplexing section 106 multiplexes the optical signals sent from the optical transmission section 105-1 and the optical transmission section 105-2 so that the polarization states thereof are at right angles to each other, and then sends out the resultants to an optical transmission line 200. The optical signals generated by the optical transmitter 10 are propagated through the optical transmission line 200, and then are received by an optical receiver 30.

Figure 11:
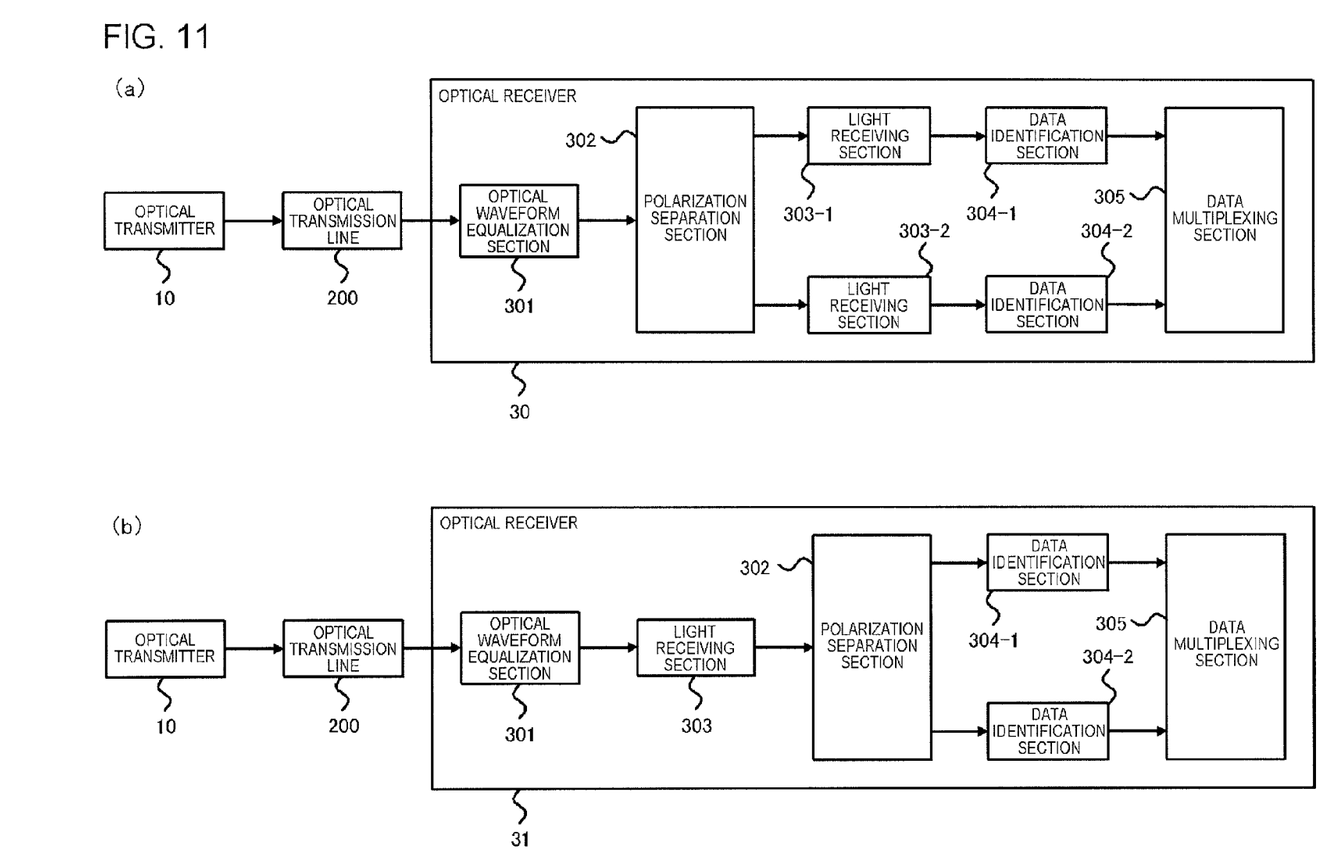
FIG. 11(a) is a block diagram illustrating the configuration of an optical receiver in the related art.
FIG. 11(b) is a block diagram illustrating the configuration of the optical receiver.

Next, a description will be made of the process of regenerating transmission data from the optical signals received by the optical receiver 30. FIG. 11 shows a configuration example of the optical receiver 30 in the optical communication system in the related art.

The optical receiver 30 includes an optical waveform equalization section 301, a polarization separation section 302, a light receiving section 303-1, a light receiving section 303-2, a data identification section 304-1, a data identification section 304-2, and a data multiplexing section 305.

The optical waveform equalization section 301 optically compensates a waveform distortion due to a wavelength dispersion received during the propagation of the optical signals through the optical transmission line 200, and then transmits the optical signals after the compensation to the polarization separation section 302.

The polarization separation section 302 separates an optical signal received by the optical waveform equalization section 301 into two optical signals generated by the optical transmission sections 105-1 and 105-2, and transmits each of the optical signals to a light receiving section 302-1 and a light receiving section 302-2.

The light receiving section 303-1 converts the optical signals sent by the polarization separation section 302 into electrical signals, and transmits the electrical signals to the data identification section 304-1. The same is true of the light receiving section 303-2.

The data identification section 304-1 converts the electrical signals sent from the light receiving section 303-1 into digital data on the basis of predetermined identification conditions appropriate to the optical modulation system, and transmits the digital data to the data multiplexing section 305. The same is true of the data identification section 304-2.

The data multiplexing section 305 regenerates original transmission data by multiplexing the digital data sent from the data identification section 304-1 and the data identification section 304-2.

However, as shown in FIG. 11(*b*), as the configuration of an optical receiver 31, a method of converting an optical signal received by the optical transmission line 200 into an electrical signal by the light receiving section 303 and then separating the electrical signals generated by the above-mentioned light receiving sections 303-1 and 303-2, respectively, from the converted electrical signal is also considered.

That is, FIG. 11(*a*) shows a configuration in which polarization separation is optically performed, and FIG. 11(*b*) shows a configuration in which polarization separation is electrically performed. As described above, the optical signal polarization-multiplexed in the optical transmitter is separated into the respective independent optical signals in the optical receiver, and then original transmission data is regenerated.

Meanwhile, an application of a wavelength dispersion measurement device (not shown) is filed that measures group velocity dispersion of an optical component located on the place from which an input and output terminal such as a transmission line optical fiber is separated, with a high degree of accuracy, without depending on residual intensity modulation.

In the wavelength dispersion measurement device, light emitted by a plurality of semiconductor lasers having different wavelengths is modulated by a plurality of light intensity modulators on the basis of a pulse of the electrical signal, and then is synthesized by an optical coupler.

The synthesized light passes through an optical component to be measured and is detected by a photodiode. The direct-current component contained in the electrical signal of the detected light and the intensity of the i/NT (i is an integer of 1 to N−1) frequency component are detected by a bandpass filter and a power meter.

Further, the average photocurrent flowing in the photodiode is measured by an ammeter. A dispersion value of the optical component to be measured is calculated from information of the intensity of the i/NT component, the average photocurrent, the pulse shape and the light source frequency which are measured (see, for example, Patent Document 1).

In addition, an application of a polarization multiplexing optical communication system (not shown) that stably separates polarization components in a simple configuration is also filed. In the polarization multiplexing optical communication system, an optical transmission section modulates and outputs any of the wavelength, the transmission timing, and the intensity of light which is a transmitted wave using a low-frequency signal transmitted from a low-frequency generator.

A polarization multiplexer synthesizes two modulated output beams in the polarization states which are at right angles to each other to generate a polarization multiplexing signal. A polarization splitter extracts and separates two polarization components which are at right angles to each other from the polarization multiplexing signal of which the polarization state is controlled by a polarization control section.

A bandpass filter extracts a component penetrating a pass band from an output signal of a light receiving section, and outputs the intensity of the component. A control circuit generates a feedback control signal for maximizing the ratio of a component of a low-frequency signal on the basis of the output intensity from the bandpass filter, and the polarization control section controls the polarization state of the polarization multiplexing signal using the feedback control signal (see, for example, Patent Document 2).

RELATED DOCUMENT

Patent Document

[Patent Document 1] Japanese Unexamined Patent Publication 2008-263590
[Patent Document 2] Japanese Unexamined Patent Publication 2000-193558

DISCLOSURE OF THE INVENTION

However, in the above-mentioned technique in the related art, there are problem as mentioned below.

In order to compensate the waveform distortion of the optical signal due to the wavelength dispersion of the optical transmission line by the optical waveform equalization section, it is necessary that the propagation characteristics of the optical waveform equalization section is caused to be identical to the inverse characteristics of the propagation characteristics of the optical transmission line.

For this reason, typically, a wavelength dispersion value of the optical transmission line is previously measured before an operation of the optical communication system, and then the propagation characteristics of the optical waveform equalization section are fixedly set.

However, in the ultrahigh-speed optical communication system exceeding 40 Gbps, since a change in the wavelength dispersion due to the environmental fluctuation in the periphery of the optical transmission line highly influences the transmission quality, it is necessary to adaptively change the propagation characteristics of the optical waveform equalization section.

In addition, when switching to another optical transmission line is performed due to an obstacle such as a cutoff of the optical fiber, it is necessary to reset the propagation characteristics of the optical waveform equalization section as rapidly as possible.

For the above-mentioned reasons, even before the operation of the optical communication system and during the operation thereof, a function of constantly monitoring the wavelength dispersion value of the optical transmission line and resetting the propagation characteristics of the optical waveform equalization section is desired. However, it is very difficult to realize the function of constantly monitoring the wavelength dispersion value of the optical transmission line in a simple manner and at a low cost without adversely influencing the transmission quality.

The present invention is contrived in view of the above-mentioned problems, and an object thereof is to provide an optical communication system, an optical receiver of the same, and an optical communication method of the same which are capable of resetting the propagation characteristics of the optical waveform equalization section in a simple manner and at a low cost without adversely influencing the transmission quality.

According to the present invention, there is provided a polarization demultiplexing optical communication system, including an optical transmitter for transmitting optical signals and an optical receiver for receiving the optical signals, that demultiplexes two independent optical signals of which carrier waves are allocated in the same frequency band and polarization states are at right angles to each other, wherein the optical transmitter includes deviation providing means that provides a predetermined frequency deviation between carrier wave frequencies of the optical signals to be transmitted, and fluctuation providing means that provides a periodic fluctuation having a predetermined frequency to light intensities of the optical signals to be transmitted, and wherein the optical receiver includes information extraction means that extracts intensity information of a frequency component of the periodic fluctuation from the received optical signals, and dispersion value calculation means that calculates a wavelength dispersion value of an optical transmission line on the basis of the extracted intensity information.

According to the present invention, there is provided an optical receiver of a polarization demultiplexing optical communication system, including an optical transmitter for transmitting optical signals and an optical receiver for receiving the optical signals, that demultiplexes two independent optical signals of which carrier waves are allocated in the same frequency band and polarization states are at right angles to each other, including: information extraction means that extracts intensity information of a frequency component of a periodic fluctuation from the received optical signals, and dispersion value calculation means that calculates a wavelength dispersion value of an optical transmission line on the basis of the extracted intensity information.

According to the present invention, there is provided an optical communication method of a polarization demultiplexing optical communication system, including an optical transmitter for transmitting optical signals and an optical receiver for receiving the optical signals, that demultiplexes two independent optical signals of which carrier waves are allocated in the same frequency band and polarization states are at right angles to each other, including: a deviation providing operation of providing a predetermined frequency deviation between carrier wave frequencies of the optical signals to be transmitted; a fluctuation providing operation of providing a periodic fluctuation having a predetermined frequency to light intensities of the optical signals to be transmitted; an information extraction operation of extracting intensity information of a frequency component of the periodic fluctuation from the received optical signals; and a dispersion value calculation operation of calculating a wavelength dispersion value of an optical transmission line on the basis of the extracted intensity information.

Meanwhile, various types of components according to the invention may be formed so as to realize functions thereof, and can be realized as for example, dedicated hardware exerting a predetermined function, a data processing device to which a predetermined function is provided by a computer program, a predetermined function realized in the data processing device by the computer program, an arbitrary combination thereof, and the like.

In addition, various types of components according to the invention are not necessarily present individually and independently, and a plurality of components may be formed as one member, one component may be formed by a plurality of members, a certain component may be a portion of another component, and a portion of a certain component and a portion of another component may be duplicated, and the like.

In the optical communication method in which the optical transmitter and the optical receiver of the optical communication system according to the invention are used, the deviation providing means of the optical transmitter provides a predetermined frequency deviation between carrier wave frequencies of the optical signals to be transmitted, and the fluctuation providing means provides a periodic fluctuation having a predetermined frequency to light intensities of the optical signal to be transmitted. Then, the information extraction means of the optical receiver extracts intensity information of a frequency component of the periodic fluctuation from the received optical signals, and the dispersion value calculation means calculates a wavelength dispersion value of an optical transmission line on the basis of the extracted intensity information. For this reason, it is possible to measure the wavelength dispersion value of the optical transmission line while operates the optical communication system. Therefore, it is possible to reset the propagation characteristics of the optical waveform equalization section in a simple manner and at a low cost without adversely influencing the transmission quality.

BRIEF DESCRIPTION OF THE DRAWINGS

The above-mentioned objects, other objects, features and advantages will be made clearer from the preferred embodiments described below, and the following accompanying drawings.

DESCRIPTION OF EMBODIMENTS (First Embodiment)

A first embodiment of the invention will be described below with reference to FIGS. 1 to 7. However, the same signs and numerals are assigned to the same components as those of one related example mentioned above with respect to the embodiment, and descriptions thereof will not be repeated. Meanwhile, although the invention can be applied to any of the configurations of FIGS. 11(a) and 11(b) mentioned above, an optical receiver having a configuration FIG. 11(a) will be described below for the purpose of simplicity.

An optical communication system 1000 of the embodiment includes an optical transmitter 100 for transmitting an optical signal and an optical receiver 300 for receiving the optical signal, as shown in FIGS. 1(a) and 1(b). The optical communication system 1000 of the embodiment is the polarization demultiplexing optical communication system 1000, and demultiplexes two independent optical signals of which carrier waves are allocated in the same frequency band and polarization states are at right angles to each other.

The optical transmitter 100 includes deviation providing means that provides a predetermined frequency deviation between carrier wave frequencies of the optical signals to be transmitted, and fluctuation providing means that provides a periodic fluctuation having a predetermined frequency to the light intensity of the optical signal to be transmitted.

The optical receiver 300 includes information extraction means that extracts intensity information of a frequency component of the periodic fluctuation from the received optical signal, and dispersion value calculation means that calculates a wavelength dispersion value of an optical transmission line on the basis of the extracted intensity information.

More specifically, as shown in FIG. 1(a), the configuration of the optical transmitter 100 according to the embodiment is different from the configuration of an optical transmitter in the related art in that an optical modulation section 107 is newly included therein. The optical modulation section 107 is a block that provides a predetermined carrier wave frequency deviation and a periodic fluctuation having a predetermined light intensity to optical signals generated in an optical transmission section 105-1 and an optical transmission section 105-2.

Therefore, the optical modulation section 107 is equivalent to the deviation providing means that provides the frequency deviation to the above-mentioned optical signal, and the fluctuation providing means that provides the periodic fluctuation. The size ($2\Delta f$) of the carrier wave frequency deviation and the frequency ($f_{AM}$) of the light intensity fluctuation which are provided to the optical signal are previously determined, and are shared in both the optical transmitter 100 and the optical receiver 300.

FIG. 1(b) shows a configuration example of the optical receiver 300 according to the invention. The configuration of the optical receiver 300 according to the invention is different from the configuration of an optical receiver in the related art in that a light branching section 306 and a wavelength dispersion value measurement section 307 are newly added thereto.

The light branching section 306 bifurcates an optical signal sent from an optical transmission line 200, and then one optical signal is sent to an optical waveform equalization section 301, and the other optical signal is transmitted to the wavelength dispersion value measurement section 307. The difference of the optical signal is only a light intensity. It is necessary that the light intensity of the optical signal transmitted to the wavelength dispersion value measurement section 307 is fixed to such an extent so as not to highly influence the transmission quality.

The wavelength dispersion value measurement section 307 calculates a wavelength dispersion value of the optical transmission line 200 on the basis of the optical signal received from the light branching section 306, and then notifies the optical waveform equalization section 301 of the wavelength dispersion value. Therefore, the light branching section 306 is equivalent to the information extraction means that extracts intensity information from the above-mentioned optical signal, and the wavelength dispersion value measurement section 307 is equivalent to the dispersion value calculation means that calculates the wavelength dispersion value on the basis of the intensity information.

The optical waveform equalization section 301 performs a control so that its propagation characteristics have inverse characteristics of the propagation characteristics of the optical transmission line 200 on the basis of the wavelength dispersion value acquired by the wavelength dispersion value measurement section 307, to thereby compensate the optical signal in which the waveform distortion is generated due to the wavelength dispersion of the optical transmission line 200. Therefore, it is possible to measure the wavelength dispersion of the optical transmission line in the optical receiver 300.

Figure 1:
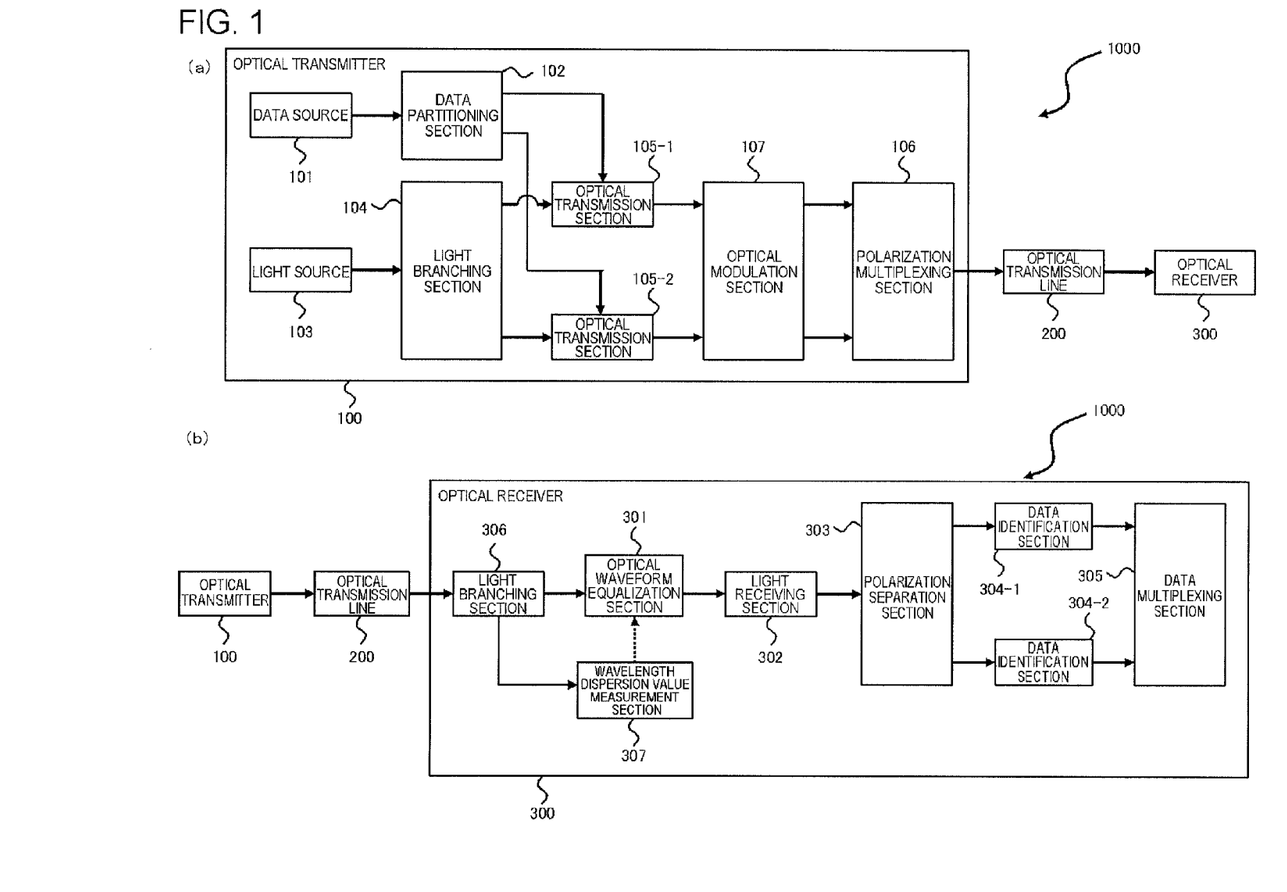
FIG. 1(a) is a block diagram illustrating the configuration of an optical transmitter of an optical communication system according to an embodiment of the invention.
FIG. 1(b) is a block diagram illustrating the configuration of an optical receiver.
Figure 2:
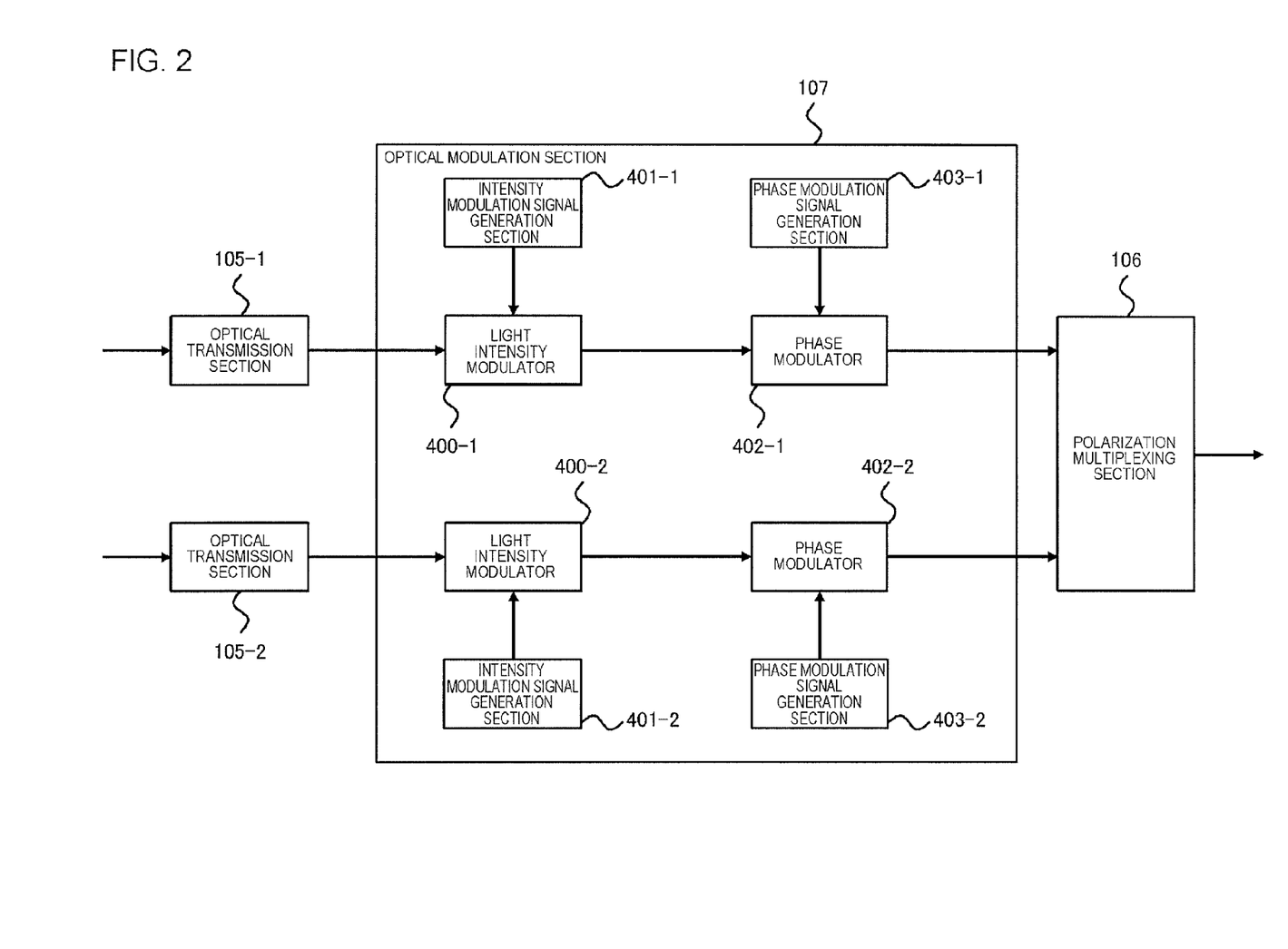
FIG. 2 is a block diagram illustrating the configuration of an optical modulation section.
Figure 3:
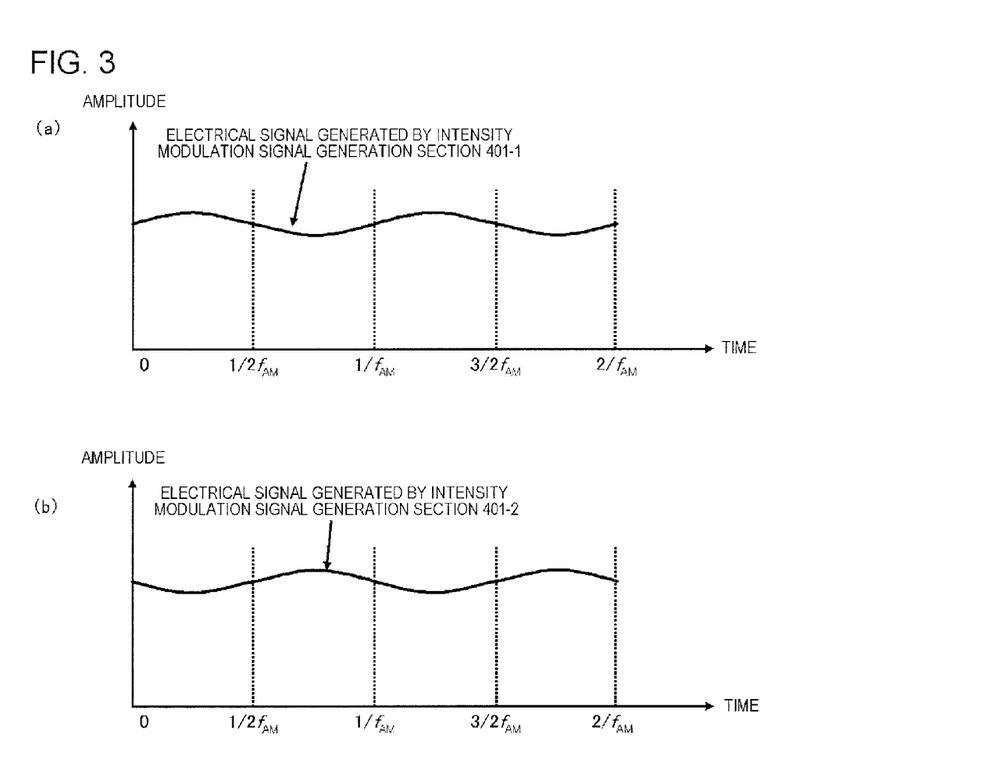
FIG. 3(a) is a characteristic diagram illustrating a time change of an electrical signal generated by an intensity modulation signal generation section.
FIG. 3(b) is a characteristic diagram illustrating a time change of an electrical signal generated by an intensity modulation signal generation section.

FIG. 2 shows a configuration example of the optical modulation section 107 in the embodiment. The optical modulation section 107 includes light intensity modulators 400-1 and 400-2, intensity modulation signal generation sections 401-1 and 401-2, optical phase modulators 402-1 and 402-2, and phase modulation signal generation sections 403-1 and 403-2.

The intensity modulation signal generation section 401-1 is a block that generates a periodic electrical signal for driving the light intensity modulator 400-1. The same is true of the intensity modulation signal generation section 401-2. FIGS. 3(a) and 3(b) show time changes in the electrical signals generated by the intensity modulation signal generation sections 401-1 and 401-2, respectively.

Both the electrical signals are the sum of a predetermined fixed value and a sinusoidal wave of the frequency $f_{AM}$. The phases of the sinusoidal wave provide the difference of $\pi$ to each other. In addition, the amplitude of the sinusoidal wave is sufficiently reduced with respect to the fixed value in order to minimize the influence on the transmission characteristics.

From the above, the electrical signal generated by the intensity modulation signal generation section 401-1 is expressed as follows.

$$e_1(t)=1+A \sin(2\pi f_{AM}t)$$

The electrical signal generated by the intensity modulation signal generation section 401-2 is expressed as follows.

$$e_2(t)=1-A \sin(2\pi f_{AM}t)$$

The above-mentioned fixed value is set to 1 for the purpose of simplicity. In addition, the amplitude of the sinusoidal wave is $A \ll 1$. In the above, although the sinusoidal wave is used as a periodic electrical signal, it is also possible to use other periodic functions such as a saw-tooth wave.

The light intensity modulator 400-1 changes and outputs the light intensity of the optical signal sent from the optical transmission section 105-1 so as to be proportional to the electrical signal input from the intensity modulation signal generation section 401-1. The same is true of the light intensity modulator 400-2.

Therefore, the average light intensities of the optical signal transmitted by the light intensity modulators 400-1 and 400-2 are respectively expressed as follows.

$$P_1(t) = P_0 e_1(t) = P_0(1 + A\sin(2\pi f_{AM} t))$$

$$P_2(t) = P_0 e_2(t) = P_0(1 - A\sin(2\pi f_{AM} t))$$

Herein, $P_0$ is an average light intensity of the optical signal transmitted from the optical transmission sections 105-1 and 105-2.

Figure 4:
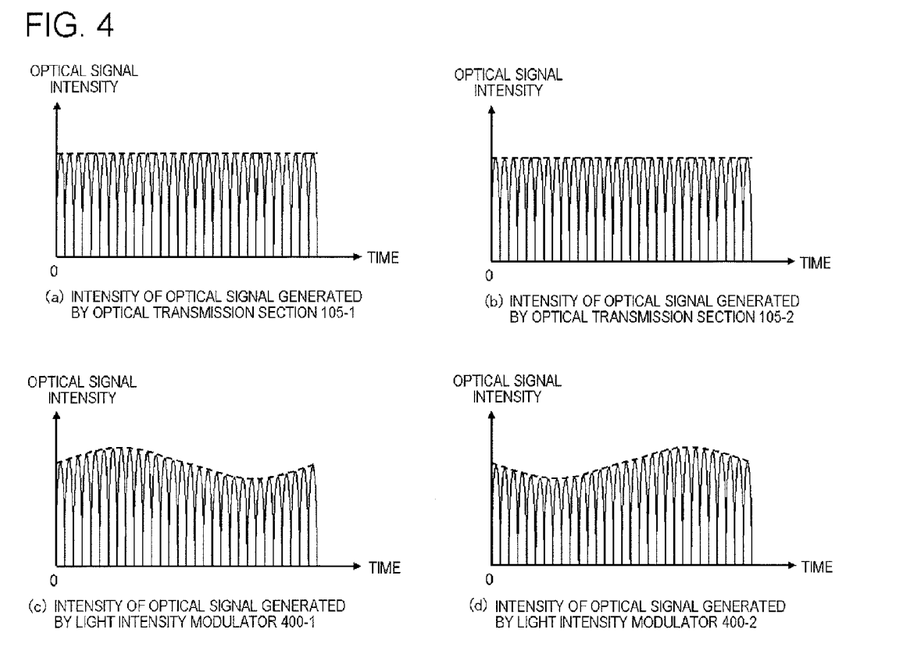
FIG. 4 is a characteristic diagram illustrating a time change of an intensity of an optical signal sent out by an optical transmission section or a light intensity modulator.

FIGS. 4(*a*) and 4(*b*) show time changes in the light intensity of the optical signal transmitted from the optical transmission sections 105-1 and 105-2, respectively. It is known from the drawings that a light pulse in which the amplitude is uniform from the optical transmission sections 105-1 and 105-2 is continuously sent out.

In addition, FIGS. 4(*c*) and 4(*d*) show time changes in the optical signal intensity of the optical signal transmitted from the light intensity modulators 400-1 and 400-2, respectively. It is known that the amplitude of the light pulse periodically changes in proportion to the periodic electrical signal generated by the intensity modulation signal generation sections 401-1 and 401-2 shown in FIG. 3.

In the above, although a description is made of the method in which the light intensity modulator is used as a method of changing the optical signal intensity, it is possible to easily realize the above-mentioned effect even when an optical attenuator is used.

In addition, there is also a method of providing a periodic fluctuation to the optical signal intensity in the optical transmission sections 105-1 and 105-2. As a device that performs an optical modulation in the optical transmission section, a Mach-Zehnder optical modulator is often used.

For the purpose of stabilizing the operation of the Mach-Zehnder optical modulator, there may be a case in which the periodic signal having a predetermined frequency is applied to a bias voltage of the Mach-Zehnder optical modulator. In order to stably operate the Mach-Zehnder optical modulator, it is necessary to apply an appropriate bias voltage to the bias terminal of the Mach-Zehnder optical modulator.

In addition, since the appropriate bias voltage temporally fluctuates, it is necessary to dynamically follow the appropriate bias voltage. As such a method, a method of applying a voltage, in which the periodic electrical signal having a predetermined frequency is added to a bias voltage, to the bias terminal of the Mach-Zehnder optical modulator is known.

When the Mach-Zehnder optical modulator is stably operated by this method, it is known that the optical signal intensity periodically fluctuates at a frequency twice the frequency of the driving signal. Therefore, it is possible to provide a periodic change to the optical signal intensity, even by using the Mach-Zehnder optical modulator in the optical modulation. Such a method has an advantage over the above-mentioned method from the viewpoint of being capable of reducing the number of parts.

The phase modulation signal generation section 403-1 is a block that generates an electrical signal for driving the optical phase modulator 402-1. The same is true of the phase modulation signal generation section 402-2.

Figure 5:
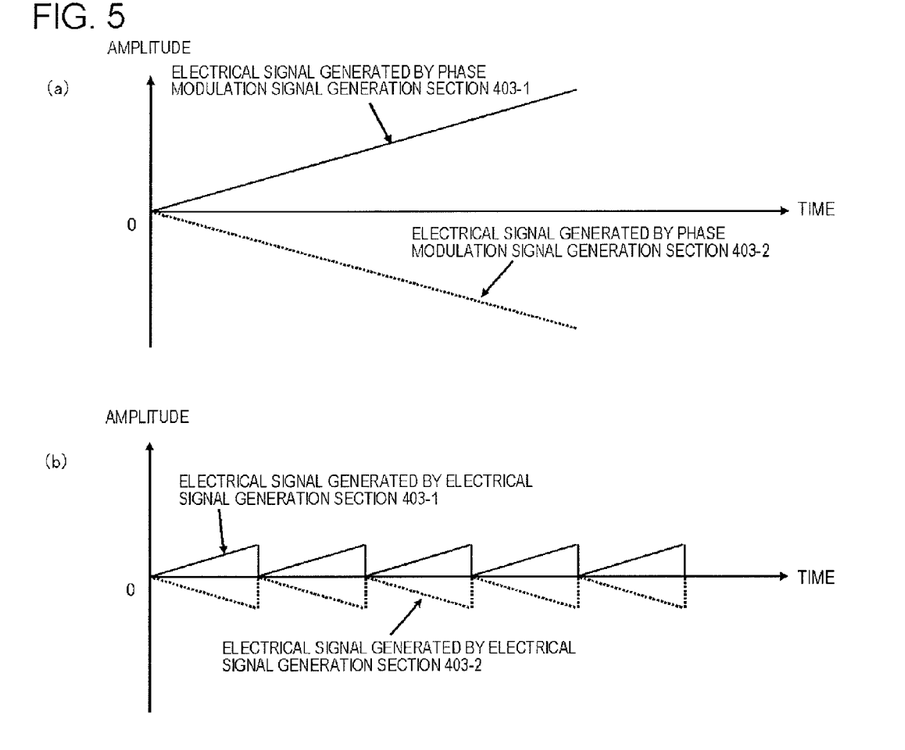
FIG. 5(a) is a characteristic diagram illustrating a time change of an electrical signal generated by a phase modulation signal generation section.
FIG. 5(b) is a characteristic diagram illustrating a time change of an electrical signal generated by a phase modulation signal generation section.

FIGS. 5(*a*) and 5(*b*) show electrical signals generated by the phase modulation signal generation sections 403-1 and 403-2, respectively. Each of the electrical signals is expressed as a linear function having a different slope.

Hereinafter, for the purpose of simplifying the calculation of the wavelength dispersion value, a linear function of which absolute values of the slope are the same and signs are different from each other is used as an electrical signal. The value of the electrical signal in time 0 is arbitrary, and thus is set to 0 herein. Hereinafter, the slope of the electrical signal generated by the phase modulation signal generation section 403-1 is set to $\Delta f > 0$, and the slope of the electrical signal generated by the phase modulation signal generation section 403-2 is set to $-\Delta f < 0$.

The optical phase modulator 401-1 is a device that changes the optical phase of the optical signal generated by the optical transmission section 105-1 by an amount proportional to the electrical signal input from the electrical signal generation section 400-1. The same is true of the optical phase modulator 401-2.

When the electrical signal for driving the optical phase modulator 401-1 temporally changes, the frequency shifts in the time derivative of the optical phase. Therefore, the carrier wave frequency of the optical signal passing through the optical phase modulator 401-1 changes by an amount proportional to the time derivative of the electrical signal for driving the optical phase modulator.

Figure 6:
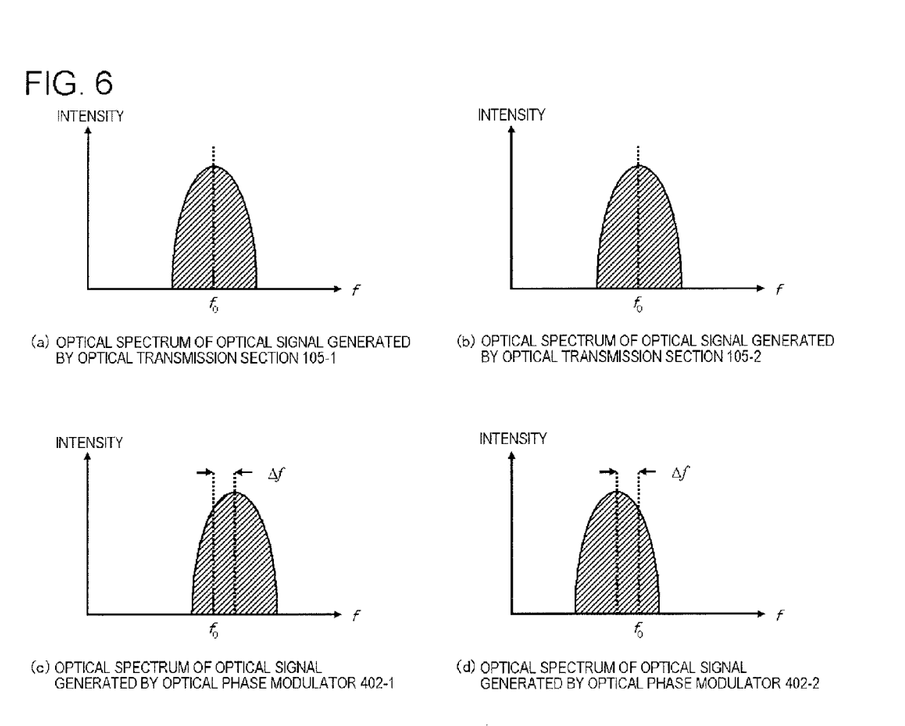
FIG. 6 is a characteristic diagram illustrating an optical spectrum of an optical signal sent out by an optical transmission section or an optical phase modulator.

FIGS. 6(*a*) and 6(*c*) show optical spectrums of the optical signals transmitted by the optical transmission sections 105-1 and 105-2, respectively. The center frequency (carrier wave frequency) $f_0$ of each optical signal is an oscillation frequency of laser light transmitted by a light source 103.

FIGS. 6(*b*) and 6(*d*) show optical spectrums of the optical signals transmitted by the optical phase modulators 400-1 and 400-2, respectively. It is known that the center frequency of the optical signal transmitted from the optical phase modulator 400-1 shifts from $f_0$ to $f_0 + \Delta f$, and the center frequency of the optical signal transmitted from the optical phase modulator 400-2 shifts from $f_0$ to $f_0 - \Delta f$.

Therefore, the carrier wave frequency deviation of the optical signals transmitted from the optical phase modulators 402-1 and 402-2 is $2\Delta f$. Meanwhile, since the upper and lower limits are actually present in the electrical signal capable of being input to optical phase modulator, it is necessary to generate a saw-tooth wave as shown in FIG. 5(*b*).

The optical phase modulation using a saw-tooth wave is generally referred to as a serrodyne modulation. As mentioned above, the carrier wave frequency deviation and the periodic fluctuation of the light intensity can be provided to the optical signals generated by the optical transmission sections 105-1 and 105-2.

Figure 7:
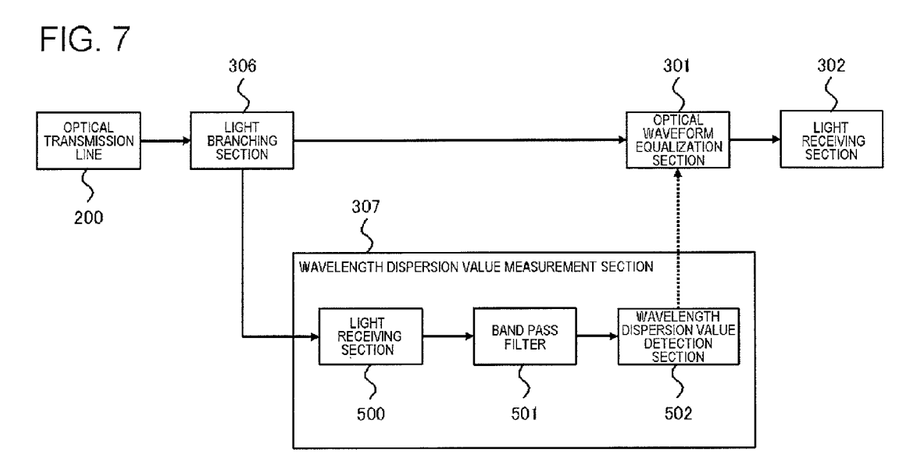
FIG. 7 is a block diagram illustrating the configuration of a wavelength dispersion value measurement section.

Next, a description will be made of a method in which the wavelength dispersion value measurement section 307 of the optical receiver 300 calculates a wavelength dispersion value by the optical signal. FIG. 7 shows a configuration example of the wavelength dispersion value measurement section 307. The wavelength dispersion value measurement section 307 includes a light receiving section 500, a bandpass filter 501, and a wavelength dispersion value detection section 502.

The light receiving section 500 converts an optical signal received by the light branching section 306 into an electrical signal and then transmits the electrical signal to the bandpass filter 501.

The bandpass filter 501 extracts a predetermined frequency component (component of the above-mentioned frequency $f_{AM}$) of the electrical signal sent from the light receiving section 500, and then transmits intensity information thereof to the wavelength dispersion value detection section 502.

The wavelength dispersion value detection section 502 calculates a wavelength dispersion value from the intensity information sent from the bandpass filter 501, and notifies the calculation result to the optical waveform equalization section 301.

Next, a method of calculating a wavelength dispersion value using the above-mentioned configuration will be described.

The propagation constant $\beta(\omega)$ in the case where the optical signal of angular frequency $\omega_0+d\omega$ is propagated through the optical transmission line can be expressed as follows.

$$\beta(\omega)=\beta_0+\beta_1 d\omega+(\tfrac{1}{2})\beta_2 d\omega^2+(\tfrac{1}{3}!)\beta_3 d\omega^3+\ldots$$

Herein, $\beta_0$ is an arbitrary constant, $\beta_1$ is a group delay, $\beta_2$ is a group velocity dispersion, and $\beta_3$ is a third-order dispersion.

Therefore, the time required for the optical signal of angular frequency $\omega_0+d\omega$ to be propagated through the optical transmission line having a transmission line length L is as follows.

$$\tau=(d\beta(\omega)/d\omega)\,L=(\beta_1+\beta_2 d\omega)\,L=L\beta_1+Dd\omega$$

Meanwhile, terms after the second order are minor and thus are omitted.

The components of the frequency $f_{AM}$ of the optical signals output by the light intensity modulators 400-1 and 400-2 are as follows, respectively, as mentioned above.

$$P_0 A \sin(2\pi f_{AM} t)$$

$$-P_0 A \sin(2\pi f_{AM} t)$$

For this reason, when a transmission line loss of the optical transmission line 200 is set to $\Gamma$, the component of the frequency $f_{AM}$ of the optical signal received by the light receiving section 500 can be expressed as follows.

$$P\sin(2\pi f_{AM}(t-\tau_1))-P\sin(2\pi f_{AM}(t-\tau_2))=P\sin(2\pi f_{AM} D\Delta\omega)\sin(2\pi f_{AM}(t-L\beta_1))$$

Herein, $P=P_0 A\Gamma$, $\Delta\omega=2\pi\Delta f$, $\tau_1=L\beta_1+D\Delta\omega$, and $\tau_2=L\beta_1-D\Delta\omega$ are defined.

Consequently, the output of the bandpass filter 501 is expressed as follows.

$$P\sin(2\pi f_{AM} D\Delta\omega)$$

since the values of P, $f_{AM}$, and $\Delta\omega$ are known fixed values, it is possible to calculate the wavelength dispersion value D. as described above, according to the invention, it is possible to measure a wavelength dispersion value of the optical transmission line even in the operation of the optical communication system.

(Second Embodiment)

Figure 8:
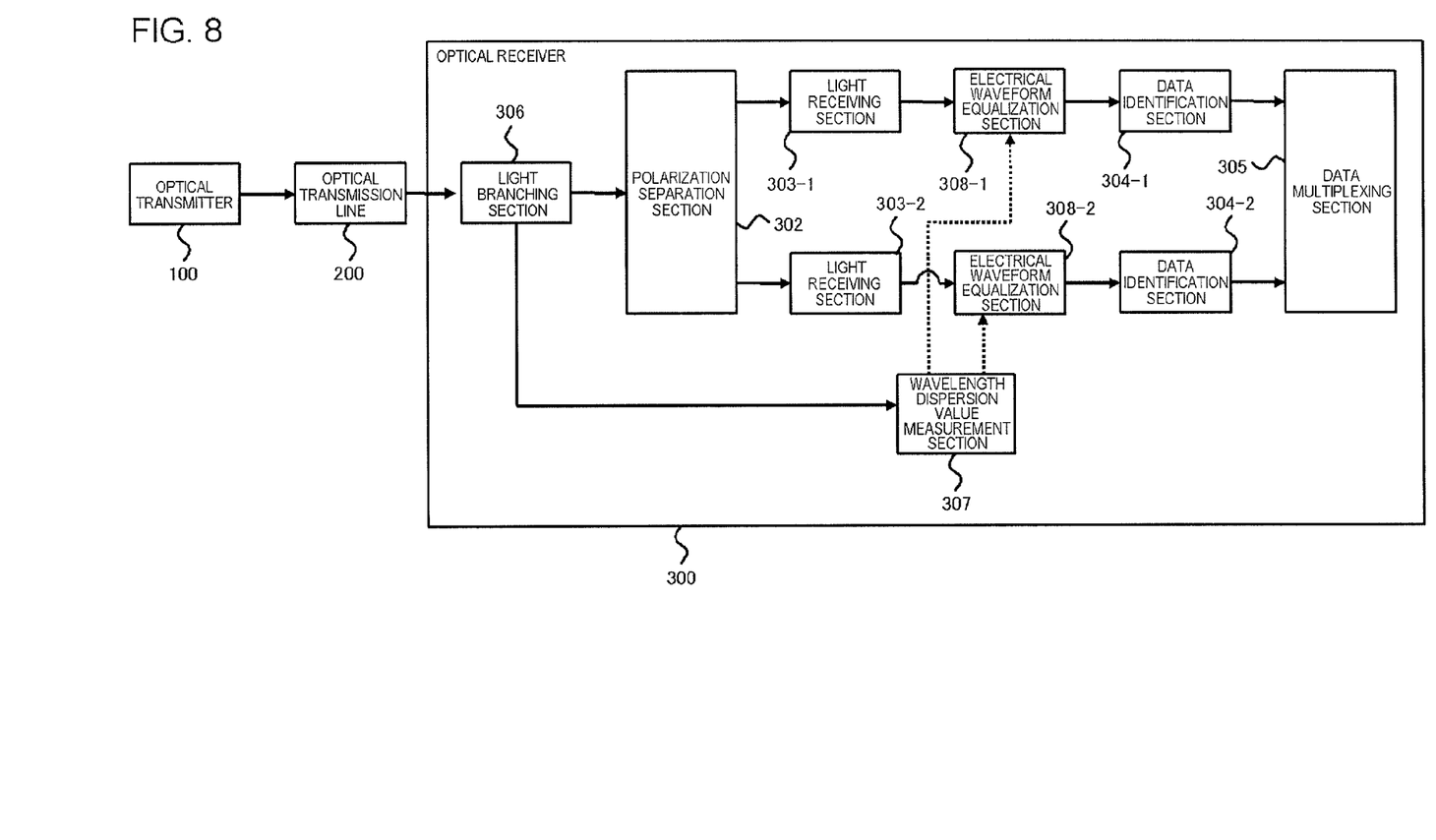
FIG. 8 is a block diagram illustrating the configuration of the optical receiver of the invention in which an electrical waveform equalization section is used.

In a second embodiment, the configuration in which the wavelength dispersion is electrically compensated will be described. The configuration of the optical transmitter 100 in the second embodiment is the same as that in the first embodiment. FIG. 8 shows a configuration example of the optical receiver 300 in the second embodiment.

The optical receiver 300 in the second embodiment is different from the optical receiver in the first embodiment, in that the optical waveform equalization section 301 is not included in the optical receiver 300 in the first embodiment, each of the electrical waveform equalization sections 308-1 and 308-2 is included immediately after the light receiving sections 303-1 and 303-2, and the wavelength dispersion value measurement section 307 notifies both the electrical waveform equalization sections 308-1 and 308-2 of the wavelength dispersion value.

Figure 9:
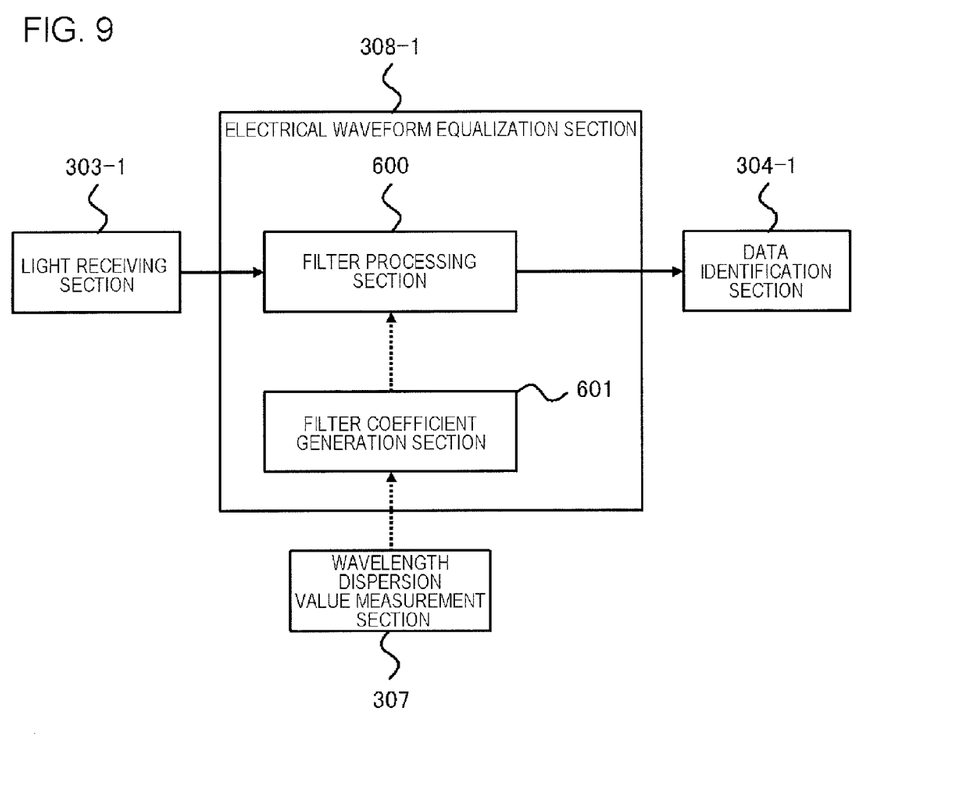
FIG. 9 is a block diagram illustrating the configuration of the electrical waveform equalization section.

FIG. 9 shows a configuration example of the electrical waveform equalization section 308-1. The same is true of the configuration of the electrical waveform equalization section 308-2. The electrical waveform equalization section 308-1 includes a filter processing section 600 and a filter coefficient generation section 601.

The filter processing section 600 is a filter capable of reproducing an arbitrary transfer function in accordance with parameters specified by the filter coefficient generation section 601. For example, when digital signal processing is performed, a finite impulse response (FIR) filter is frequently used. In addition, there may be a case in which the frequency domain equalization using fast Fourier transformation is also used.

The filter coefficient generation section 601 calculates parameters for generating a filter having inverse characteristics of the propagation characteristics of the optical transmission line from the wavelength dispersion value acquired by the wavelength dispersion value measurement section 307, and then notifies the filter processing section 600.

When the FIR filter is used in the filter processing section 600, a coefficient of each tap of the FIR filter (hereinafter, referred to as the tap coefficient) is specified. In order to calculate each tap coefficient, the propagation characteristics (transfer function) of the optical transmission line having a value obtained by inverting a sign of the wavelength dispersion value of the optical transmission line 200 is calculated on the frequency domain, and then an impulse response is found by performing an inverse Fourier transformation on the characteristics.

The filter processing section 600 may be notified of the obtained impulse response as each tap coefficient of the FIR filter. In addition, when the frequency domain equalization is used, the filter processing section may be notified of the propagation characteristics on the frequency domain used in calculating the above-mentioned impulse response as it is. As described above, according to the embodiment, it is possible to apply the invention even when the waveform equalization is electrically performed.

Meanwhile, the invention is not limited to the embodiments, but various types of changes can be made without departing from the scope thereof. For example, as mentioned above, in the embodiments, the optical receiver 30 having a configuration of FIG. 11(*a*) has been described below for the purpose of simplicity. However, the invention can be applied to any of the configurations of the optical receiver 30 of FIG. 11(*a*) and the optical receiver 31 of FIG. 11(*b*) mentioned above (not shown).

In addition, in the descriptions of the first and second embodiments according to the invention, the content of the invention has been described taking the optical communication system making use of one carrier wave frequency as an example. However, even in an optical communication system that performs wavelength division multiplexing (WDM) on a plurality of optical signals having carrier wave frequencies different from each other, it is possible to use the invention by applying the invention for each carrier wave.

Meanwhile, the embodiment and a plurality of modified examples mentioned above can be naturally combined in the range consistent with the contents thereof. In addition, in the embodiment and modified examples mentioned above, although the structure and the like of each part have been specifically described, it is possible to variously change the structure and the like in the range that satisfies the invention.

Priority is claimed on Japanese Patent Application No. 2009-136215, filed on Jun. 5, 2009, the content of which is incorporated herein by reference.

The invention claimed is:

1. A polarization demultiplexing optical communication system, comprising an optical transmitter for transmitting optical signals and an optical receiver for receiving the optical signals, that demultiplexes two independent optical signals of which carrier waves are allocated in the same frequency band and polarization states are at right angles to each other, wherein the optical transmitter includes
deviation providing means that provides a predetermined frequency deviation between carrier wave frequencies of the optical signals to be transmitted, and
fluctuation providing means that provides a periodic fluctuation having a predetermined frequency to light intensities of the optical signals to be transmitted, and
wherein the optical receiver includes
information extraction means that extracts intensity information of a frequency component of the periodic fluctuation from the received optical signals, and
dispersion value calculation means that calculates a wavelength dispersion value of an optical transmission line on the basis of the extracted intensity information.

2. The optical communication system according to claim 1, wherein the deviation providing means includes
an optical phase modulator that changes optical phases of the optical signals, respectively, and
signal generation means that generates a driving signal of the optical phase modulator.

3. The optical communication system according to claim 2, wherein the signal generation means generates the driving signal expressed by a linear function of the time which has different slopes depending on the optical signals.

4. The optical communication system according to claim 2, wherein the deviation providing means executes a serrodyne modulation by the optical phase modulator, and slopes of a saw-tooth wave used in the serrodyne modulation are different depending on the optical signals.

5. The optical communication system according to claim 1, wherein the fluctuation providing means includes
a light intensity modulator that changes the light intensities of the optical signals so as to be proportional to an intensity control signal to be input, and
intensity control means that generates the intensity control signal of the light intensity modulator.

6. The optical communication system according to claim 5, wherein the intensity control means generates the control signal so that the periodic fluctuations of the light intensities in the two optical signals have the same frequencies and are in-phase or reverse-phase with respect to each other.

7. The optical communication system according to claim 1, wherein the fluctuation providing means includes
an optical attenuator that attenuates the light intensities of the optical signals in response to an attenuation control signal to be input, and
intensity control means that generates the attenuation control signal of the optical attenuator.

8. The optical communication system according to claim 1, wherein the fluctuation providing means includes
a Mach-Zehnder optical modulator that changes the light intensities of the optical signals in accordance with a stability control signal applied to a bias terminal in order to perform a stability control, and
intensity control means that generates the stability control signal of the Mach-Zehnder optical modulator.

9. The optical communication system according to claim 1, wherein the information extraction means is made of a band-pass filter.

10. The optical communication system according to claim 1, further comprising waveform equalization means that compensates a waveform distortion due to a wavelength dispersion of the optical transmission line on the basis of the wavelength dispersion value calculated by the dispersion value calculation means.

11. An optical receiver of a polarization demultiplexing optical communication system, including an optical transmitter for transmitting optical signals and an optical receiver for receiving the optical signals, that demultiplexes two independent optical signals of which carrier waves are allocated in the same frequency band and polarization states are at right angles to each other, comprising:
information extraction means that extracts intensity information of a frequency component of a periodic fluctuation from the received optical signals, and
dispersion value calculation means that calculates a wavelength dispersion value of an optical transmission line on the basis of the extracted intensity information.

12. An optical communication method of a polarization demultiplexing optical communication system, including an optical transmitter for transmitting optical signals and an optical receiver for receiving the optical signals, that demultiplexes two independent optical signals of which carrier waves are allocated in the same frequency band and polarization states are at right angles to each other, comprising:
a deviation providing operation of providing a predetermined frequency deviation between carrier wave frequencies of the optical signals to be transmitted;
a fluctuation providing operation of providing a periodic fluctuation having a predetermined frequency to light intensities of the optical signals to be transmitted;
an information extraction operation of extracting intensity information of a frequency component of the periodic fluctuation from the received optical signals; and
a dispersion value calculation operation of calculating a wavelength dispersion value of an optical transmission line on the basis of the extracted intensity information.

* * * * *